US007512957B2

(12) United States Patent
Cohen et al.

(10) Patent No.: US 7,512,957 B2
(45) Date of Patent: Mar. 31, 2009

(54) INTERFACE INFRASTRUCTURE FOR CREATING AND INTERACTING WITH WEB SERVICES

(75) Inventors: Shy Cohen, Bellevue, WA (US); Geary L. Eppley, Carnation, WA (US); Douglas M. Purdy, Bellevue, WA (US); James E. Johnson, Bellevue, WA (US); Stephen J. Millet, Edmonds, WA (US); Stephen T. Swartz, Seattle, WA (US); Vijay K. Gajjala, Sammamish, WA (US); Aaron Abraham Stern, Bellevue, WA (US); Alexander Martin DeJarnatt, Seattle, WA (US); Alfred M. Lee, IV, Seattle, WA (US); Anand Rjagopalan, Sammamish, WA (US); Anastasios Kasiolas, San Mateo, CA (US); Chaitanya D. Upadhyay, Kirkland, WA (US); Christopher G. Kaler, Sammamish, WA (US); Craig Andrew Critchley, Fall City, WA (US); David Edwin Levin, Redmond, WA (US); David Owen Driver, Seattle, WA (US); David Wortendyke, Seattle, WA (US); Douglas A. Walter, Issaquah, WA (US); Elliot Lee Waingold, Seattle, WA (US); Erik Bo Christensen, Seattle, WA (US); Erin P. Honeycutt, Redmond, WA (US); Eugene Shvets, Seattle, WA (US); Evgeny Osovetsky, Bellevue, WA (US); Giovanni M. Della-Libera, Seattle, WA (US); Jesus Ruiz-Scougall, Sammamish, WA (US); John David Doty, Seattle, WA (US); Jonathan T. Wheeler, Bothell, WA (US); Kapil Gupta, Redmond, WA (US); Kenneth David Wolf, Seattle, WA (US); Krishnan Srinivasan, Kirkland, WA (US); Lance E. Olson, Sammamish, WA (US); Matthew Thomas Tavis, Seattle, WA (US); Mauro Ottaviani, Mercer Island, WA (US); Max Attar Feingold, Bellevue, WA (US); Michael James Coulson, Clyde Hill, WA (US); Michael Jon Marucheck, Bellevue, WA (US); Michael Steven Vernal, Seattle, WA (US); Michael Thomas Dice, Redmond, WA (US); Mohamed-Hany Essam Ramadan, Redmond, WA (US); Mohammad Makarechian, Seattle, WA (US); Natasha Harish Jethanandani, Seattle, WA (US); Richard Dievendorff, Bellevue, WA (US); Richard Douglas Hill, Kirkland, WA (US); Ryan Thomas Sturgell, Seattle, WA (US); Saurab Nog, Sammamish, WA (US); Scott Christopher Seely, Bellevue, WA (US); Serge Sverdlov, Bellevue, WA (US); Siddhartha Puri, Sammamish, WA (US); Sowmyanarayanan K. Srinivasan, Redmond, WA (US); Stefan Batres, Sammamish, WA (US); Stefan Harrington Pharies, Seattle, WA (US); Tirunelveli Vishwanath, Redmond, WA (US); Tomasz Janczuk, Redmond, WA (US); Uday S. Hegde, Bellevue, WA (US); Umesh Madan, Bellevue, WA (US); Vaithialingam B. Balayogan, Bellevue, WA (US); Vipul Arunkant Modi, Redmond, WA (US); Yaniv Pessach, Redmond, WA (US); Yasser Shohoud, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 602 days.

(21) Appl. No.: 11/003,307
(22) Filed: Dec. 3, 2004
(65) Prior Publication Data
US 2006/0150200 A1 Jul. 6, 2006

(51) Int. Cl.
*G06F 3/00* (2006.01)

(52) U.S. Cl. ....................................... 719/328

(58) Field of Classification Search .................. 719/328
See application file for complete search history.

(56) References Cited

U.S. PATENT DOCUMENTS

| | | | | |
|---|---|---|---|---|
| 6,131,166 | A * | 10/2000 | Wong-Insley | 713/300 |
| 6,598,093 | B1 * | 7/2003 | Schmidt et al. | 719/328 |
| 7,340,745 | B2 * | 3/2008 | Waldorf | 719/328 |
| 2003/0028685 | A1 | 2/2003 | Smith et al. | 709/328 |
| 2003/0167356 | A1 | 9/2003 | Smith et al. | 709/318 |

* cited by examiner

*Primary Examiner*—Meng-Ai An
*Assistant Examiner*—Lechi Truong
(74) *Attorney, Agent, or Firm*—Workman Nydegger

(57) ABSTRACT

A web services namespace pertains to an infrastructure for enabling creation of a wide variety of applications. The infrastructure provides a foundation for building message-based applications of various scale and complexity. The infrastructure or framework provides APIs for basic messaging, secure messaging, reliable messaging and transacted messaging. In some embodiments, the associated APIs are factored into a hierarchy of namespaces in a manner that balances utility, usability, extensibility and versionability.

23 Claims, 9 Drawing Sheets

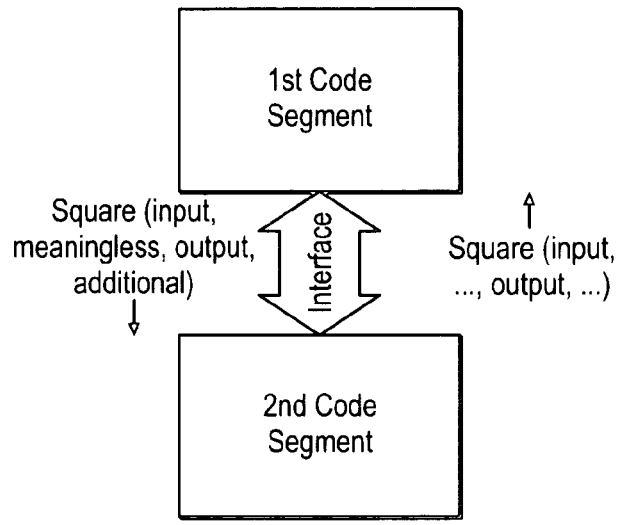
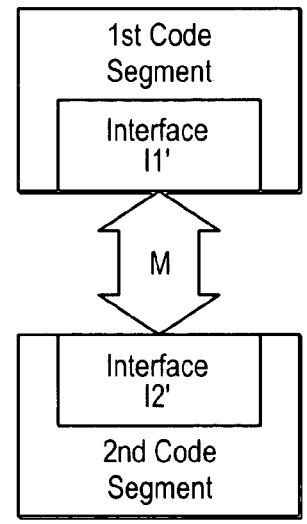
Fig. 9
Fig. 10
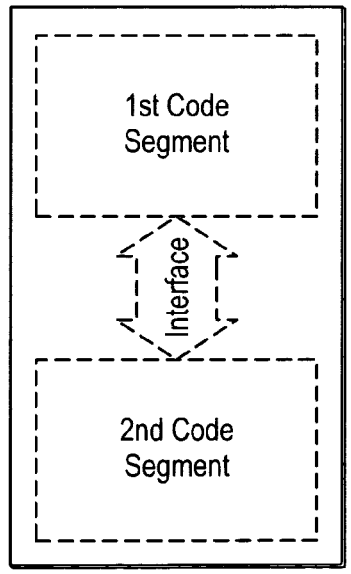
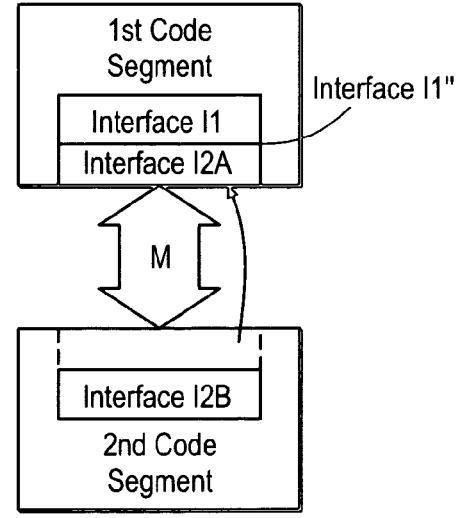
Fig. 11
Fig. 12

INTERFACE INFRASTRUCTURE FOR CREATING AND INTERACTING WITH WEB SERVICES

BACKGROUND OF THE INVENTION

1. The Field of the Invention

The present invention relates to software development. More particularly, the present invention relates to an Application Program Interface (API) that facilitates use of a software platform by application programs and computer hardware to create and interact in distributed computing activities.

2. Background and Related Art

Computing technology has transformed the way we work and play. Computing systems now take a wide variety of forms including desktop computers, laptop computers, tablet PCs, Personal Digital Assistants (PDAs), household devices and the like. In its most basic form, a computing system includes system memory and one or more processors. Software in the system memory may be executed by the processor to direct the other hardware of the computing system to perform desired functions.

Software has been generally divided into "operating system" software and "application" software. While it is not absolutely necessary for a computing system to have an operating system, operating systems are helpful in general purpose computing systems as they manage and control the computing hardware and perform generalized system tasks such as file management, thread scheduling, multitasking, and the like. The application software may perform more specialized tasks and, when necessary, may call upon the system level functions offered by the operating system. The presence of an operating system makes application development much more streamlined, since basic functions do not need to be redeveloped for each application.

The operating system makes available many core functions to application software. Application developers can cause the application software to call upon the functions exposed by the operating system, by drafting source code that complies with an Application Program Interface (API). During runtime, the application program calls upon the operating system when executing the processor-level instructions compiled from that source code. Accordingly, application software requests resources by calling individual API functions. API functions also serve as the means by which the operating system may provide any related information back to the application software. The term API is used to refer to a single function call to the operating system, as well as the collection of possible function calls to the operating system. In addition, the term API is applied to both the source code representation of the function call as well as the in-memory representation of the function call.

Over the past few years, the universal adoption of the Internet, and networking technology in general, has changed the landscape for computer software developers. Traditionally, software developers focused on single-site software applications for standalone desktop computers, or LAN-based computers that were connected to a limited number of other computers via a local area network (LAN). These applications utilized well-defined APIs to access the underlying operating system of the computer.

As the Internet evolved and gained widespread acceptance, the industry began to recognize the power of hosting applications at various sites on the World Wide Web (or simply the "Web"). In the networked world, clients from anywhere may submit requests to server-based applications hosted at diverse locations and receive responses back in fractions of a second.

These Web applications, however, were typically developed using the same operating system platform that was originally developed for standalone computing machines or locally networked computers. Unfortunately, in some instances, these applications do not adequately transfer to the distributed computing regime. The underlying platform was simply not constructed with the idea of supporting limitless numbers of interconnected computers.

To accommodate the shift to the distributed computing environment being ushered in by the Internet, Microsoft Corporation developed a software platform known as the ".NET" Framework (read as "Dot Net") or Microsoft® .NET. Microsoft® .NET is software for connecting people, information, systems, and devices. The platform allows developers to create Web services that will execute over the Internet. This dynamic shift was accompanied by a set of API functions for the .NET Framework.

As use of the .NET Framework has become increasingly common, ways to increase the efficiency and/or performance of the platform have been identified. The inventors have developed a unique set of API functions to allow for such increased efficiency and/or performance.

BRIEF SUMMARY OF THE INVENTION

The principles of the present invention are directed towards a unique set of API functions that allows for increased efficiency and performance when interfacing with the .NET framework using web services namespaces. A web services namespace pertains to an infrastructure for enabling creation of a wide variety of applications, and the term "web" is not intended to limit or in any way restrict application using the web services namespace to be used for Internet applications. The infrastructure provides a foundation for building message-based applications of various scale and complexity. The infrastructure or framework provides APIs for basic messaging, secure messaging, reliable messaging and transacted messaging. In some embodiments, the associated APIs are factored into a hierarchy of namespaces in a manner that balances utility, usability, extensibility and versionability.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings, in which like reference numerals refer to like elements. Understanding that these drawings depict only typical embodiments of the invention and are not therefore to be considered to be limiting of its scope, the invention will be described and explained with additional specificity and detail through the use of the accompanying drawings in which:

FIG. 9 is a block diagram that describes aspects of programming interfaces in accordance with one embodiment;

FIG. 10 is a block diagram that describes aspects of programming interfaces in accordance with one embodiment;

FIG. 11 is a block diagram that describes aspects of programming interfaces in accordance with one embodiment;

FIG. 12 is a block diagram that describes aspects of programming interfaces in accordance with one embodiment;

DETAILED DESCRIPTION OF THE PREFERRED EMBODIMENTS

The principles of the present invention relate to a unique set of Application Program Interface (API) functions that allows for increased efficiency and performance when interfacing with the .NET framework using web services namespaces. A web services namespace pertains to an infrastructure for enabling creation of a wide variety of applications. The infrastructure provides a foundation for building message-based applications of various scale and complexity. The infrastructure or framework provides APIs for basic messaging, secure messaging, reliable messaging and transacted messaging. In some embodiments, the associated APIs are factored into a hierarchy of namespaces in a manner that balances utility, usability, extensibility and versionability.

In the described implementation, the network platform utilizes eXtensible Markup Language (XML), an open standard for describing data. XML is managed by the World Wide Web Consortium (W3C). XML is used for defining data elements on a Web page and business-to-business documents. XML uses a similar tag structure as HTML; however, whereas HTML defines how elements are displayed, XML defines what those elements contain. HTML uses predefined tags, but XML allows tags to be defined by the developer of the document. Thus, virtually any data items can be identified, allowing XML documents to function like database records. Through the use of XML and other open protocols, such as Simple Object Access Protocol (SOAP), the platform allows integration of a wide range of services that can be tailored to the needs of the user. Although the embodiments described herein are described in conjunction with XML and other open standards, such are not required for the operation of the claimed invention. Other equally viable technologies will suffice to implement the inventions described herein.

As used herein, the phrase application program interface or API includes traditional interfaces that employ method or function calls, as well as remote calls (e.g., a proxy, stub relationship) and SOAP/XML invocations.

Exemplary Network Environment

Figure 1:
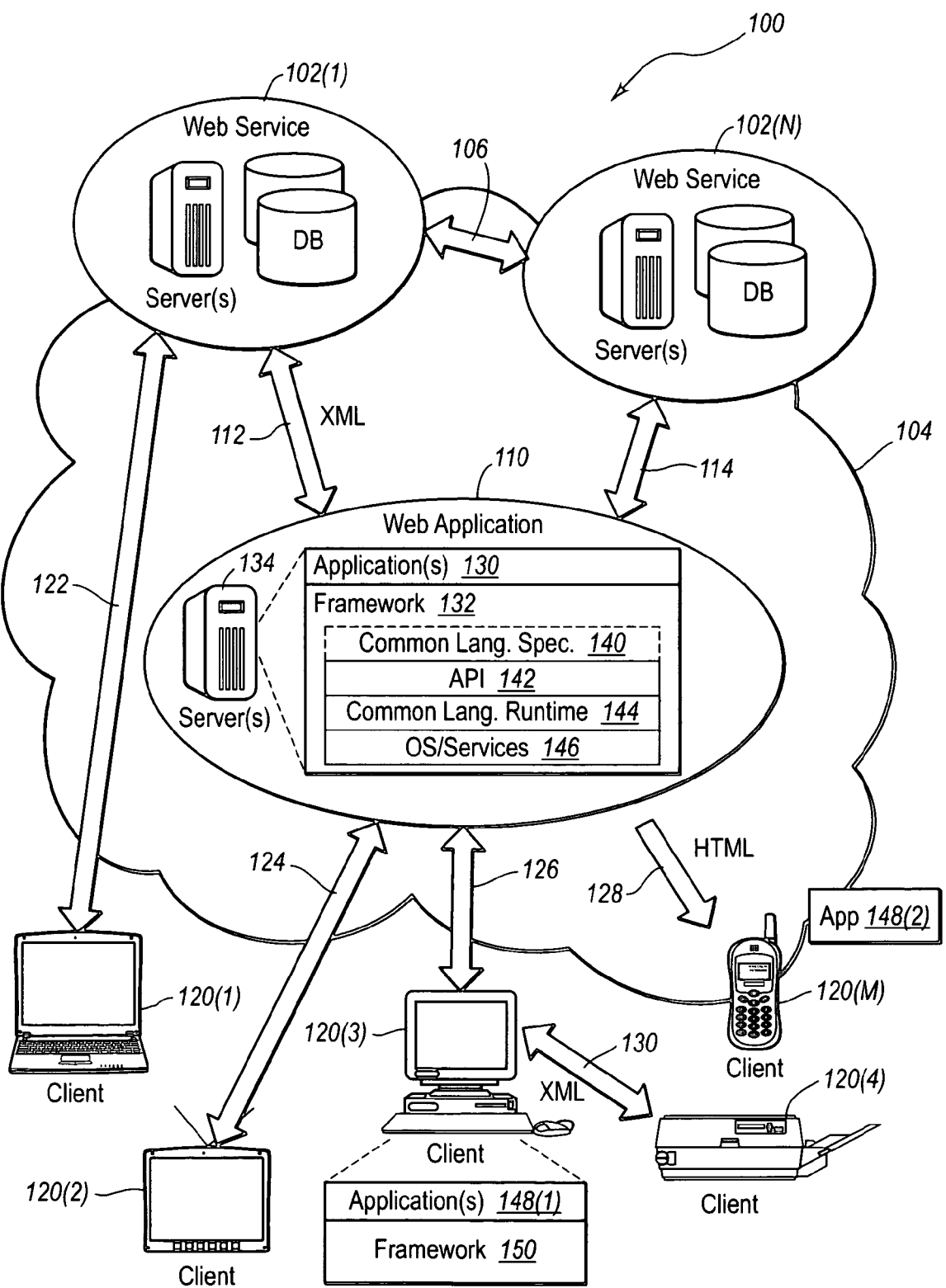
FIG. 1 illustrates a network architecture in which clients access Web services using conventional protocols.

FIG. 1 shows a network environment 100 in which a network platform, such as the .NET Framework, may be implemented. The network environment 100 includes representative Web services 102(1), ..., 102(N), which provide services that can be accessed over a network 104 (e.g., Internet) or using inter-process communication. The Web services, referenced generally as number 102, are programmable application components that are reusable and interact programmatically over the network 104, typically through industry standard Web protocols, such as XML, Simple Object Access Protocol (SOAP), Wireless Application Protocol (WAP), HyperText Transport Protocol (HTTP), and Simple Mail Transfer Protocol (SMTP), although other means of interacting with the Web services over the network may also be used, such as Remote Procedure Call (RPC) or object broker type technology. A Web service can be self-describing and is often defined in terms of formats and ordering of messages.

Web services 102 are accessible directly by other services (as represented by communication link 106) or a software application, such as Web application 110 (as represented by communication links 112 and 114). Each Web service 102 is illustrated as including one or more servers that execute software to handle requests for particular services. Web services may be configured to perform any one of a variety of different services. Examples of Web services include login verification, notification, database storage, stock quoting, location directories, mapping, music, electronic wallet, calendar/scheduler, telephone listings, news and information, games, ticketing, and so on. The Web services can be combined with each other and with other applications to build variably complex systems and intelligent interactive experiences.

The network environment 100 also includes representative client devices 120(1), 120(2), 120(3), 120(4), ..., 120(M) that utilize the Web services 102 (as represented by communication link 122) and/or the Web application 110 (as represented by communication links 124, 126, and 128). The clients may communicate with one another using standard protocols as well, as represented by an exemplary XML link 130 between clients 120(3) and 120(4).

The client devices, referenced generally as number 120, can be implemented many different ways. Examples of possible client implementations include, without limitation, portable computers, stationary computers, tablet PCs, televisions/set-top boxes, wireless communication devices, personal digital assistants, gaming consoles, printers, photocopiers, and other smart devices.

The Web Service application 110 is an application designed to run on the network platform and may utilize the Web Service services 102 when handling and servicing requests from clients 120. The Web Service application 110 is composed of one or more software applications 130 that run atop a programming framework 132, which are executing on one or more servers 134 or other computer systems. Note that a portion of Web Service application 110 may actually reside on one or more of computers 120. Alternatively, Web Service application 110 may coordinate with other software on clients 120 or other computers to accomplish its tasks.

The programming framework 132 is the structure that supports the applications and services developed by application developers. It permits multi-language development and seamless integration by supporting multiple programming languages. It supports open protocols, such as SOAP, and encapsulates the underlying operating system and object model services. The framework provides a robust and secure execution environment for the multiple programming languages and offers secure, integrated class libraries.

The framework 132 is a multi-tiered architecture that includes an API layer 142, a common language runtime (CLR) layer 144, and an operating system/services layer 146. This layered architecture allows updates and modifications to various layers without impacting other portions of the framework. A common language specification (CLS) 140 allows designers of various languages to write code that is able to access underlying library functionality. The specification 140 functions as a contract between language designers and library designers that can be used to promote language interoperability. By adhering to the CLS, libraries written in one language can be directly accessible to code modules written in other languages to achieve seamless integration between code modules written in one language and code modules written in another language. One exemplary detailed implementation of a CLS is described in an ECMA standard created by participants in ECMA TC39/TG3.

The API layer 142 presents groups of functions that the applications 130 can call to access the resources and services provided by layer 146. By exposing the API functions for a network platform, application developers can create Web Service applications for distributed computing systems that make full use of the local and network resources and other Web Service services, without needing to understand the complex interworkings of how those network resources actually operate or are made available. Moreover, the Web Service applications can be written in any number of programming languages, and translated into an intermediate language supported by the common language runtime 144 and included as part of the common language specification 140. In this way, the API layer 142 can provide methods for a wide and diverse variety of applications.

Additionally, the framework 132 can be configured to support API calls placed by remote applications executing remotely from the servers 134 that host the framework. Representative applications 148(1) and 148(2) residing on clients 120(3) and 120(M), respectively, can use the API functions by making calls directly, or indirectly, to the API layer 142 over the network 104.

The framework may also be implemented at the clients. Client 120(3) represents the situation where a framework 150 is implemented at the client. This framework may be identical to server-based framework 132, or modified for client purposes. Alternatively, the client-based framework may be condensed in the event that the client is a limited or dedicated function device, such as a cellular phone, personal digital assistant, handheld computer, or other communication/computing device.

Developers' Programming Framework

Figure 2:
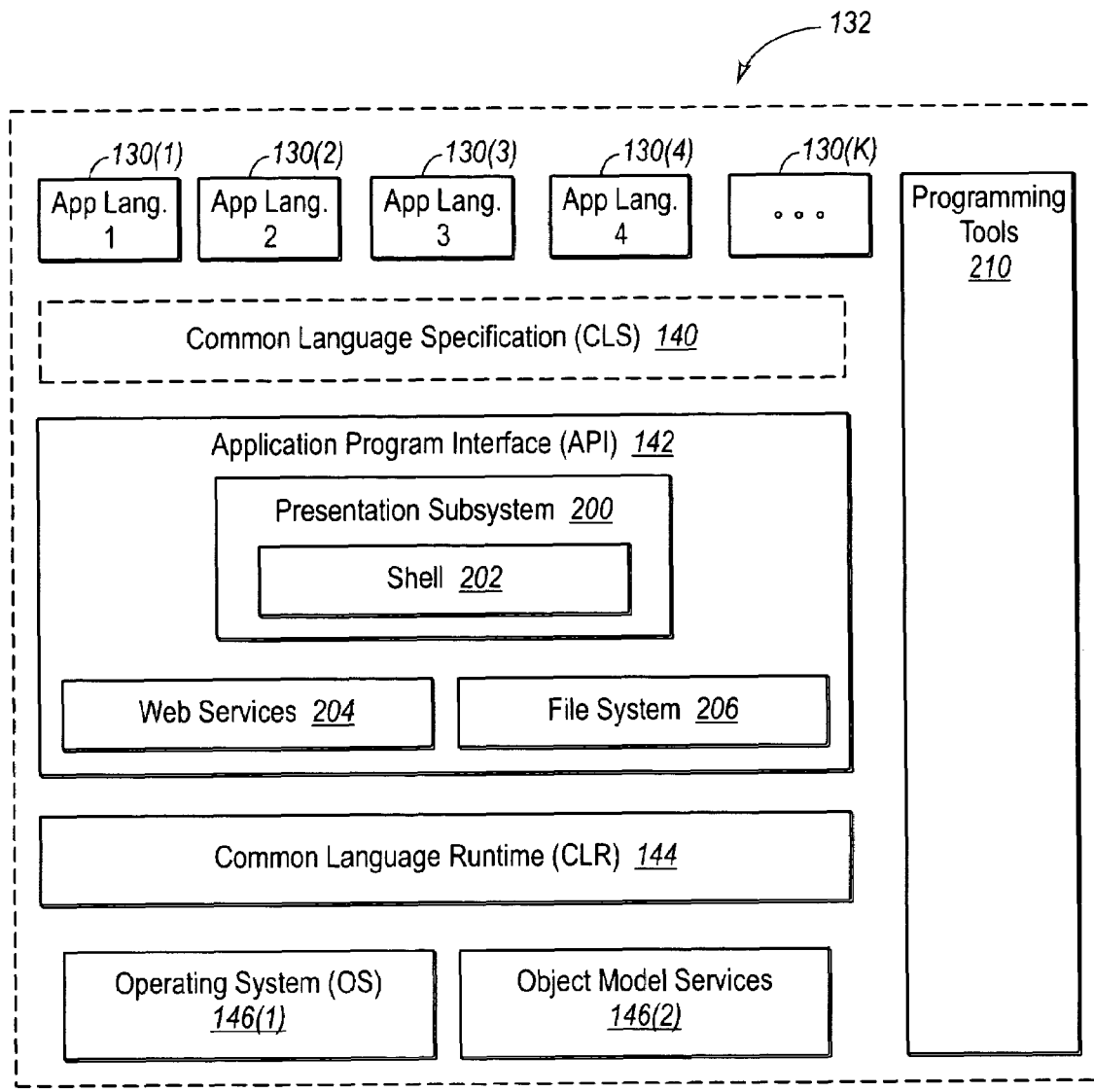
FIG. 2 is a block diagram of a software architecture for a network platform, which includes an application program interface (API)

FIG. 2 shows the programming framework 132 in more detail. The common language specification (CLS) layer 140 supports applications written in a variety of languages 130(1), 130(2), 130(3), 130(4), ... , 130(K). Such application languages include Visual Basic, C++, C#, COBOL, Jscript, Perl, Eiffel, Python, and so on. The common language specification 140 specifies a subset of features or rules about features that, if followed, allow the various languages to communicate. For example, some languages do not support a given type (e.g., an "int*" type) that might otherwise be supported by the common language runtime 144. In this case, the common language specification 140 does not include the type. On the other hand, types that are supported by all or most languages (e.g., the "int[ ]" type) is included in common language specification 140 so library developers are free to use it and are assured that the languages can handle it.

This ability to communicate results in seamless integration between code modules written in one language and code modules written in another language. Since different languages are particularly well suited to particular tasks, the seamless integration between languages allows a developer to select a particular language for a particular code module with the ability to use that code module with modules written in different languages. The common language runtime 144 allow seamless multi-language development, with cross language inheritance, and provide a robust and secure execution environment for the multiple programming languages. For more information on the common language specification 140 and the common language runtime 144, the reader is directed to co-pending applications entitled "Method and System for Compiling Multiple Languages", filed Jun. 21, 2000 (Ser. No. 09/598,105) and "Unified Data Type System and Method" filed Jul. 10, 2000 (Ser. No. 09/613,289), which are incorporated by reference.

The framework 132 encapsulates the operating system 146(1) (e.g., Windows®-brand operating systems) and object model services 146(2) (e.g., Component Object Model (COM) or Distributed COM). The operating system 146(1) provides conventional go functions, such as file management, notification, event handling, user interfaces (e.g., windowing, menus, dialogs, etc.), security, authentication, verification, processes and threads, memory management, and so on. The object model services 146(2) provide interfacing with other objects to perform various tasks. Calls made to the API layer 142 are handed to the common language runtime layer 144 for local execution by the operating system 146(1) and/or object model services 146(2).

The API 142 groups API functions into multiple namespaces. Namespaces essentially define a collection of classes, interfaces, delegates, enumerations, and structures, which are collectively called "types", that provide a specific set of related functionality. A class represents managed heap allocated data that has reference assignment semantics. A delegate is an object oriented type-safe function pointer. An enumeration is a special kind of value type that may take one of several predefined values represented by named constants. A structure represents static allocated data that has value assignment semantics. An interface defines a contract that other types can implement.

By using namespaces, a designer can organize a set of types into a hierarchical namespace. The designer is able to create multiple groups from the set of types, with each group containing at least one type, that exposes logically related functionality. In the exemplary implementation, the API 142 is organized to include three root namespaces. It should be noted that although only three root namespaces are illustrated in FIG. 2, additional root namespaces may also be included in API 142. The three root namespaces illustrated in API 142 are: a first namespace 200 for a presentation subsystem (which includes a namespace 202 for a user interface shell), a second namespace 204 for web services, and a third namespace 206 for a file system. Each group can then be assigned a name. For instance, types in the presentation subsystem namespace 200 can be assigned the name "Windows", and types in the file system namespace 206 can be assigned the name "Storage". The named groups can be organized under a single "global root" namespace for system level APIs, such as an overall System namespace.

By selecting and prefixing a top level identifier, the types in each group can be easily referenced by a hierarchical name that includes the selected top level identifier prefixed to the name of the group containing the type. For instance, types in the file system namespace 206 can be referenced using the hierarchical name "System.Storage". In this way, the individual namespaces 200, 204, and 206 become major branches off of the System namespace and can carry a designation where the individual namespaces are prefixed with a designator, such as a "System." prefix.

The presentation subsystem namespace 200 pertains to programming and content development. It supplies types that allow for the generation of applications, documents, media presentations and other content. For example, presentation subsystem namespace 200 provides a programming model that allows developers to obtain services from the operating system 146(1) and/or object model services 146(2). The shell namespace 202 pertains to user interface functionality. It supplies types that allow developers to embed user interface functionality in their applications, and further allows developers to extend the user interface functionality.

The web services namespace 204 pertains to an infrastructure for enabling creation of a wide variety of applications, e.g. applications as simple as a chat application that operates between two peers on an intranet, and/or as complex as a scalable Web service for millions of users. The described infrastructure is advantageously highly variable in that one need only use those parts that are appropriate to the complexity of a particular solution. The infrastructure provides a foundation for building message-based applications of various scale and complexity. The infrastructure or framework provides APIs for basic messaging, secure messaging, reliable messaging and transacted messaging. In the embodiment described below, the associated APIs have been factored into a hierarchy of namespaces in a manner that has been carefully crafted to balance utility, usability, extensibility and versionability.

The file system namespace 206 pertains to storage. It supplies types that allow for information storage and retrieval.

In addition to the framework 132, programming tools 210 are provided to assist the developer in building Web Services and/or applications. One example of the programming tools 210 is Visual Studio®, a multi-language suite of programming tools offered by Microsoft Corporation.

Root Namespaces

Figure 3:
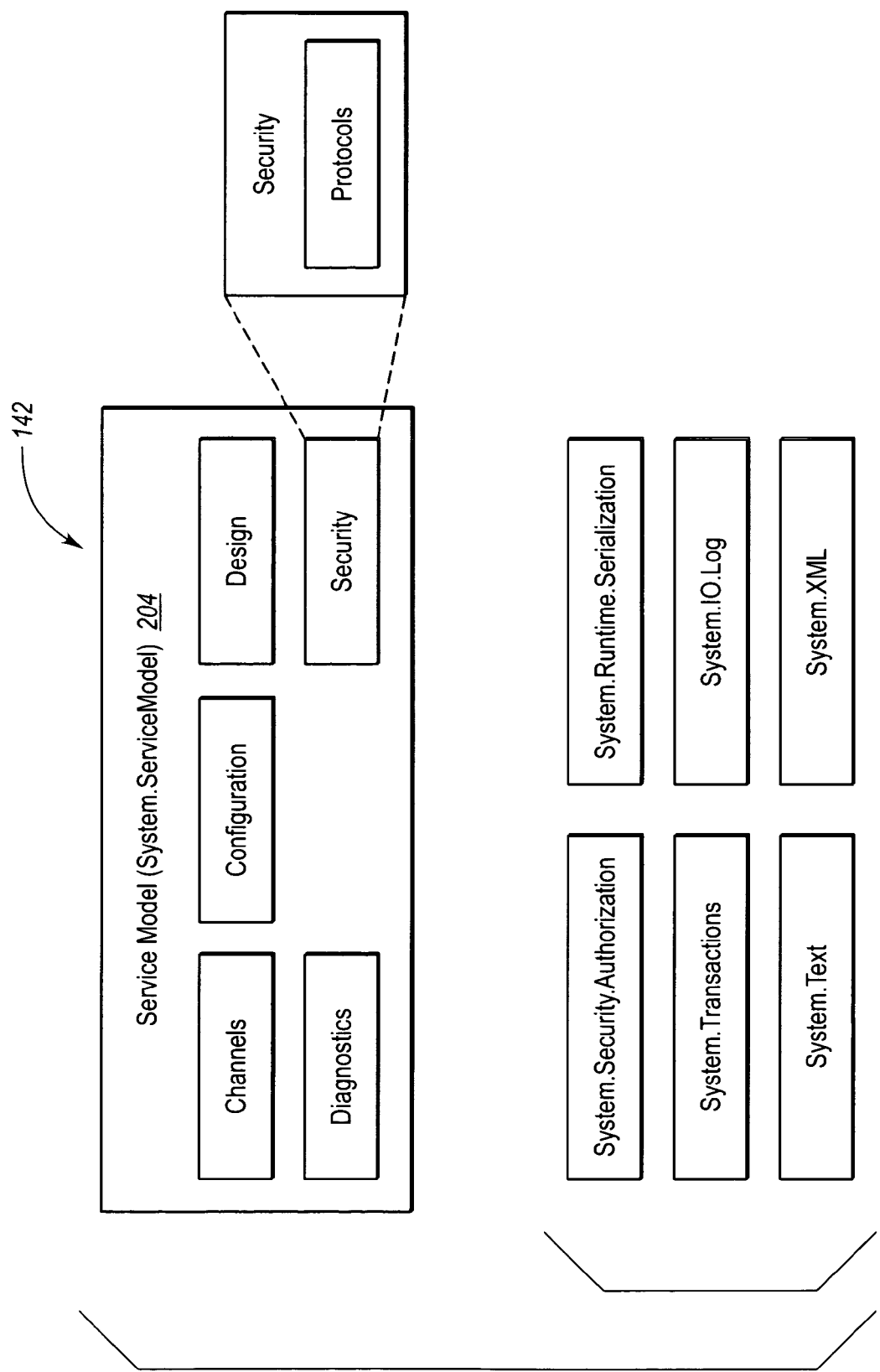
FIG. 3 is a block diagram of unique namespaces supported by the API, each namespace representing one or more function classes having a common characteristic.

FIG. 3 shows the API 142 and one of its root namespaces, i.e. web services 204, in more detail. In one embodiment, the namespaces are identified according to a hierarchical naming convention in which strings of names are concatenated with periods. With this naming convention in mind, the following provides a general overview of selected namespaces of the API 142, although other naming conventions could be used with equal effect.

The web services namespace 204 is identified by the root name "System.ServiceModel". Within the "System.ServiceModel" namespace are sub-namespaces for:
- channels (i.e. "System. ServiceModel.Channels"),
- configuration (i.e. "System.ServiceModel.Configuration"),
- design (i.e. "System.ServiceModel.Design"),
- diagnostics (i.e. "System.ServiceModel.Diagnostics"), and
- security (i.e. "System.ServiceModel.Security")

In addition, within the "System.ServiceModel.Security" namespace is a sub-namespace for:
- protocols (i.e. "System.ServiceModel.Security.Protocols"), Additionally, there are additional namespaces that support functionality other than and having utility outside of messaging. These include "System.Security.Authorization", "System.Runtime.Serialization", "System.Transactions", "System.IO.Log", "System.Text", and "System.XML".

Each of these illustrated namespaces and their corresponding core classes will now be described in further detail.

System.ServiceModel

System.ServiceModel is the root namespace that encapsulates all of the Service Model. Specifically, this namespace represents the APIs that are utilized to write a distributed, message-passing application using Web Service messages. This set of APIs is grouped together because it represents a logical, core layer of the Service Model, and it is possible to write an application using only those APIs and no other Service Model namespaces. The core classes of this namespace include the following:

BasicProfileHttpBinding—Built in WS-I BP 1.1 binding.

BasicProfileHttpsBinding—Built-in WS-I BP 1.1 binding over HTTPS.

ChannelFactory<T>—Used to create the client-side runtime.

ContractDescription—Describes a service contract. Contains a collection of OperationDescriptions that each contains a collection of MessageDescriptions.

EndpointAddress—The EndpointAddress (and its contained class AddressProperties) represents the definition of the address of a Web Service. It includes a number of aspects pertaining to the service's address, including its SOAP address (ActingAs), it's transport address (Address), metadata-contributing headers (EndpointHeaders), metadata-agnostic headers (InstanceHeaders), security identity (Identity), and information about the Binding and Contract implemented at that endpoint.

IChannelFactory—The IChannelFactory interface represents the base interface for actively creating channels. It has two sets of methods on it—CanCreateChannel<T>( ), which allows users to query whether a particular type of IChannel is supported, and CreateChannel<T>( . . . ), which allows users to create a particular type of IChannel to the specified endpoint.

IListenerFactory—The IListenerFactory interface represents the base interface for listening at a network address and creating IListeners. It exposes types of functionality—ways to configure the network address (ListenUri, SetListenUri, SetUniqueListenUri) and ways to create IListeners (CreateListener<T>( . . . ), CanCreateListener <T>( )).

IListeners are generally created on IListenerFactories by passing in a Message filter. Messages that are received at a Listener Factory and that match a Listener's filter are delivered to that Listener. This can be analogized to the way that TCP/IP works—a computer (Listener Factory) listens on a particular IP address. Sockets bind to particular TCP ports (Filters). Packets that arrive on a particular IP address are de-multiplexed to sockets based on port number, similar to the way that Messages that arrive at a particular Listener Factory are de-multiplexed to Listeners based on the Filters.

IListenerFactories are generally used by acceptors of a communication pattern. See IChannelFactory for details on how channels are actively created.

IntermediaryHttpBinding—Intermediary HTTP binding.

IntermediaryTcpBinding—Intermediary TCP binding.

Message—The Message is the fundamental unit of communication between applications in the Service Model.

It is the container within which all data exchange between Web Services is encapsulated. It is the Service Model equivalent of an IP packet. The structure of a message loosely corresponds to that of the SOAP envelope. A message contains both a set of message headers and a body, which correspond to the SOAP Header blocks and the SOAP Body, respectively. The set of headers which can be included in a message is extensible. Several default header types are defined and specified, specifically those related to message addressing and message expiration. Others are defined by other Service Model components and/or by third-party developers.

MessageDescription—Describes a service message.
MsmqsBinding—MSMQ integration binding.
NetMsmqBinding—MSMQ binding
NetMsmqsBinding—Secure MSMQ binding.
NetNamedPipeBinding—Named pipe binding.
NetTcpBinding—Non interoperable TCP binding.
NetTcpsBinding—Non interoperable TCPS binding.
OperationAttribute—When used in accordance with the .NET Framework Attribute model, this attribute marks a method as part of the service contract and allows the developer to configure aspects of the operation.
OperationDescription—Describes a service operation. Contains a collection of MessageDescriptions.
SecurityBindingElement—This class and its related classes (SOAPAuthenticationMode, SecurityContextMode, ChannelSecurityCredentials, ServiceSecurityCredentials, ChannelSecurityBehaviors, ServiceSecurityBehaviors) provide the framework for configuring the SOAP security in the channel stack. That is, they determine the type of security to be applied to the message.
ServiceContractAttribute—When used in accordance with the .NET Framework Attribute model, this attribute marks an interface as a service contract and lets the developer configure aspects of the contract.
ServiceDescription—An in-memory representation of a service's runtime requirements that can be used for various purposes including building a suitable runtime environment, generating metadata, and code or configuration information.
ServiceEndpoint—Represents a portal for communicating with the world and contains an endpoint address, a contract and a binding.
ServiceHost<T>—A container for the runtime that provides a specific service type with communications ability.
WsHttpBinding—Interoperable WS (non BP) binding over HTTP.
WsHttpsBinding—Interoperable WS (non BP) binding over HTTPS.

System.ServiceModel.Channels

System.ServiceModel.Channels is the main namespace for the Service Model transport, reliability, and queuing Channel Factories and Listener Factories. These classes represent the concrete implementation of the Web Services communication sub-system. This set of APIs is grouped together because it represents a logical, holistic layer of communication APIs for acting upon SOAP messages. The core classes of this namespace include the following:

BinaryMessageEncoder—The BinaryMessageEncoder represents an abstraction for converting a Message object into a series of octets using the .NET-BinaryFormat encoding of the Message, and vice versa. It defines methods for taking a Stream or ArraySegment<byte> and returning an instance of a Message object, and for taking a Message and writing that Message to a Stream or ArraySegment<byte>.
HttpChannelFactory—The HttpChannelFactory class represents the base class for actively creating HTTP channels. HTTP channels are used to send message to and possibly receive responses from services using the SOAP-over-HTTP protocol.
HttpListenerFactory—The HttpListenerFactory class represents the base class for listening at an HTTP address for SOAP messages and accepting channels initiated to that address. Messages communicated via the SOAP-over-HTTP protocol may be accepted on channel accepted off the HttpListenerFactory (and its helper IListener).
NamedPipeChannelFactory—The NamedPipeChannelFactory class represents the base class for actively creating Named Pipe channels. Named Pipe channels are used to send messages to and possibly receive responses from services using the .NET-MessageFraming protocol over Windows Named Pipes.
NamedPipeListenerFactory—The NamedPipeListenerFactory class represents the base class for listening at a Named Pipe address for SOAP messages and accepting channels initiated to that address. Messages communicated via the .NET-MessageFraming protocol over Windows Named Pipes may be accepted on channels accepted off the NamedPipeListenerFactory (and its helper IListener).
ReliableChannelFactory—The ReliableChannelFactory class represents the base class for actively creating Reliable channels. Reliable channels are used to send message to and possibly receive responses from services using the WS-ReliableMessaging protocol over any supported transport.
ReliableListenerFactory—The Reliable class represents the base class for listening for new Reliable channels. Messages communicated using the WS-ReliableMessaging protocol may be accepted on channels accepted off the ReliableListenerFactory (and its helper IListener).
TcpChannelFactory—The TcpChannelFactory class represents the base class for actively creating TCP channels. TCP channels are used to send messages to and possibly receive responses from services using the .NET-MessageFraming protocol over a TCP stream.
TcpListenerFactory—The TcpListenerFactory class represents the base class for listening at a TCP address for SOAP messages and accepting channels initiated to that address. Messages communicated via the .NET-MessageFraming protocol over TCP streams may be accepted on channels accepted off the TcpListenerFactory (and its helper IListener).
TextMessageEncoder—The TextMessageEncoder represents an abstraction for converting a Message object into a series of octets using the standard XML encoding of the Message, and vice versa. It defines methods for taking a Stream or ArraySegment<byte> and returning an instantiated Message and for taking a Message and writing that Message to a Stream or ArraySegment<byte>.

System.ServiceModel.Configuration

The System.ServiceModel.Configuration namespace contains classes for storing persistent settings for Service Model applications. These APIs are grouped together because they are primarily accessed after development of an application. These classes are not used by a developer when writing a Service Model application, but rather after the application is written. The separate namespace makes this distinction clear. Core classes of this namespace include the following:

ServiceBindingsSection—ServiceBindingsSection contains all the configuration for a particular Service Model bindings. The functionality of these configuration settings closely mirrors the functionality of the equivalent classes in the programming model.

ServiceModelSectionGroup—ServiceModelSectionGroup is a container class for all the Service Model configuration. It is also an accessor class used when programmatically reading and writing all other Service Model configuration.

ServicesSection—ServicesSection contains all the configuration settings for implemented services in a .NET Framework AppDomain.

System.ServiceModel.Design

The System.ServiceModel.Design namespace contains the types that deal with transforming descriptions (ServiceDescription and ChannelDescription). These include ServiceLoader and ChannelLoader which create descriptions from code and config, and ServiceDescriptionImporter and ServiceDescriptionExporter which import and export metadata and code generators. It also includes types that build a runtime environment from ServiceDescription and ChannelDescription. These types are grouped under one namespace because they all transform ServiceDescription and ChannelDescription in some way. The namespace ends with Design because many of the scenarios it supports are strictly design time scenarios or runtime scenarios that precede any message exchange (once may think of them as "an application setting itself up" scenarios). Core classes of this namespace include the following:

ChannelBuilder—Builds listener and channel stacks based on ServiceDescription and ChannelDescription ChannelLoader—Builds a ChannelDescription based on a typed channel and associated binding.

ServiceDescriptionImporter/Exporter—Generate ServiceDescription from metadata and vice versa.

ServiceLoader—Creates a ServiceDescription from service type and associated contracts and bindings.

System.ServiceModel.Diagnostics

The System.ServiceModel.Diagnostics namespace exposes types that are used for monitoring and diagnosing Service Model applications through direct inspection and control of runtime state, and through a persistent stream of traces. The scenarios in which these classes are used are related to observing and controlling the behavior of a Service Model application rather than creating the application. The APIs are grouped into the namespace to clarify that functional distinction. Core classes of this namespace include the following:

IWSTransferContract—IWSTransferContract is an interface that implements the WS-Transfer protocol. WS-Transfer is part of the WS-Management suite of protocols, and is used for inspecting running instances of Web Service applications.

MessageWriterTraceListener—MessageWriterTraceListener is an implementation of the Systems.Diagnostics.TraceListener class that is used for logging the Web Service's incoming and outgoing messages.

System.ServiceModel.Security

The System.ServiceModel.Security namespace contains the types that pertain to message security. It contains implementations of SOAP Message security, WS-Trust, WS-SecureConversations and other WS-* Security protocols. It contains classes for obtaining security tokens, for serialization of security tokens, for validating security tokens by calling into the types in the System.Security.Authorization namespace and for performing authorization checks by calling types in the System.Security.Authorization namespace. It also contains the security binding abstraction (a security binding is a message security pattern). Core classes in this namespace include the following:

SecurityBindingFactory—SecurityBindingFactory is a framework to manage security templates (bindings). A security template (binding) is a particular formulation of a secure message compliant with SOAP message security protocols. It secures outgoing message and verifies incoming message as per the template. This class creates instances of SecurityBinding, an abstract base class that all security bindings derive from. The SecurityBinding class provides the SecureOutgoingMessage and ValidateIncomingMessage functionality.

SecurityBindingFactory has specific implementations in the ServiceModel.Security.Protocols namespace. Some of which are listed below:
-AnonymousOverAsymmetricSecurityBindingFactory
-BasicOverAsymmetricSecurityBindingFactory
-BasicOverSymmetricSecurityBindingFactory
-BasicOverTransportSecurityBindingFactory
-CryptoOverAsymmetricSecurityBindingFactory
-CryptoOverTransportSecurityBindingFactory
-SessionSecurityBindingFactory
-SoapSecurityBindingFactory
-SymmetricSecurityBindingFactory
-TransportSecurityBindingFactory SecurityTokenAuthenticator—Token authenticators store the authentication settings that should be used for token validation and instantiates a token given it's type-specific parts.

SecurityTokenProvider—SecurityTokenProviders provide the functionality to obtain the security token to be used in authenticating a principal at the remote endpoint.

SecurityTokenResolver—SecurityTokenResolver is the public framework to create and match references to a token (and find out about prerequisite tokens)

SecurityTokenSerializer—SecurityTokenSerializer serializes SecurityTokens into XML, deserializes token XML into type-specific format-neutral parts, and invokes TokenAuthenticator to produce securityToken. It also knows how to serialize and deserialize internal and external token references.

System.ServiceModel.Security.Protocols

This namespace contains specific implementations of SOAP message security matching certain well defined and analyzed security patterns (called security bindings). It contains concrete implementations of the framework defined in System.ServiceModel.Security.

System.Security.Authorization

The System.Security.Authorization namespace contains all the classes responsible for the core security functionality involving security tokens, claims, and authorization. This functionality is presented in a separate namespace than the Service Model namespace to allow other messaging frameworks to utilize the security functionality it presents. This namespace includes the following core classes:

IClaim—The basis of the security model is a claim—a statement that is made by an issuing party. A claim is represented by an object which minimally implements the IClaim interface. The IClaim interface in turn implements the IMatchPolicy interface. This interface exposes the Match method. This is used to determine if a specified claim "matches" the object implementing the Match method. New interfaces are derived from IClaim to create a taxonomy of claims. Ultimately objects implement these interfaces, which can themselves be derived into other interfaces. This namespace defines four top-level types of claims: identity, attribute, issue, and access decisions. Identity claims make statements about how to identify a party. This can be a principal or a key holder. Attribute claims are statements about an identity such as a phone number or birth date. Issue claims indicate that the specified identity is allowed to issue a specific type of claim. Access decision claims are rights or capabilities that have been authorized or conferred on the indicated identity.

IClaimSet—In this model a claim is just a single statement. Consequently, the next logical component is a set of claims. These are provided by objects which implement the IClaimSet interface. A set of claims can have an arbitrary set of claims with the exception that it can only have a single key bearing claim.

ICrypto—The ICrypto interface represents the cryptographic operations that a key holder can perform. The cryptographic operations could either be symmetric or asymmetric.

ISecurityToken—A security token is an object that supports the IClaimsProvider and ICryptoProvider interfaces, meaning that it is a container of claim sets and exposes cryptographic providers for cryptographic operations. The Validate method is called to check and validate a token. Validation ensures that all issuing authority signatures are confirmed and effectively merges those authorities' claim sets with its own so that the issuance delegation chain can be validated as part of authorization.

System.Runtime.Serialization

The System.Runtime.Serialization namespace contains the XML Formatter classes (the Service Model's main serialization engine), related classes, as well as custom attributes and interfaces used to mark serializable classes—these attributes and interfaces form the Service Model's serialization programming model. This namespace includes the following core classes:

DataContractAttribute—This custom attribute is used to declare that a type is serializable and is annotated according to the new Service Model serialization programming model, and to set certain serialization properties for the type.

DataMemberAttribute—In the new Service Model serialization programming model, this custom attribute is used to declare that a given field or property should be serialized. It can also be used to control certain serialization settings for the field or property.

KnownTypeAttribute—This custom attribute is used to add a type to the "known-types collection", which is the set of types that the serialization engine will try if it does not know which type to deserialize an object into.

UnknownSerializationData—This class is used for round-tripping information between different versions of the same object: when deserializing an instance of a newer version of an object into an older version, any information not understood by the older version gets stored in UnknownSerializationData. When the older object is serialized, the data stored in UnknownSerializationData gets serialized as well, ensuring that no data is lost if the serialized data then has to be de-serialized back into the newer version.

XmlFormatter—This class is the Service Model's main serialization engine—by calling methods on this class, a serialization or de-serialization operation may be initiated.

System.Transactions

The System.Transactions namespace includes two child namespaces: System.Transactions.Isolation and System.Transactions.Recovery.

System.Transactions.Isolation

The System.Transactions.Isolation namespace gives applications the ability to isolate a resource among cooperating clients. The types in it support isolation for volatile and durable lockable resources, and variable-granularity resources support. This namespace includes the following core classes:

LockContext—Represents a client context on whose behalf resources are being locked LockManager—Representations a collection of locks, provides lifetime management of locks LockScope—Represents the boundaries of an operation on a resource ResourceLock—Represents a lock System.Transactions.Recovery The System.Transactions.Recovery namespace provides a logging object model that helps developers of resource managers. The Log class supports different units of works, compensating records, and checkpoints. This namespace includes the following core classes:

Log—Represents a resource manager's recovery log

LogRecord—Represents a single record written to a recovery log

SavePoint—Represents a save point in a unit of work, and provides methods to truncate, merge, and rollback logs UnitOfWork—Represents a logical unit of work in a resource manager's log, and provides methods for prepare, commit, and rollback the unit of work.

System.IO.Log

The System.IO.Log namespace contains classes that provide a simple interface to a record-oriented sequential I/O system. It also contains the managed interface to WINDOWS® CLFS (Common Log File System). This namespace includes the following core class:

IRecordSequence—An interface that provides a record sequence abstraction

System.Text

The System.Text namespace houses the helper classes used by the Service Model XML Infrastructure components (Xml Readers and Writers) to perform various forms of binary/text encoding and decoding (Base64 and BinHex). This namespace includes the following core classes:

Base64Encoding—Handles encoding and decoding of binary data in the Base64 format.

BinHexEncoding—Handles encoding and decoding of binary data in the BinHex format.

System.XML

System.Xml contains the Service Model "XML Infrastructure"—optimized XML Readers and Writers used by the Service Model serialization but also useful independently. The two sets of readers and writers currently supported are performance-optimized readers and writers for UTF8 text XML, as well as readers/writers for the Service Model proprietary binary format. This namespace includes the following core classes:

IXmlDictionary—A class implementing IXmlDictionary can serve as a repository of XmlDictionaryString objects.

XmlBinaryReader, XmlBinaryWriter—These classes read and write XML in Service Model's proprietary binary format.

XmlDictionaryReader, XmlDictionaryWriter—These abstract classes form a base for all other readers and writers in this namespace, and introduce new methods to the standard XML reader and writer API that allow for the use of string dictionaries (see XmlDictionaryString class). I.e. one can call WriteString with an XmlDictionaryString instead of a normal string, and the writer, if it supports it, may write just the dictionary ID of the string (instead of the entire string), thereby achieving size savings.

XmlDictionaryString—This class essentially serves to combine a string with a unique ID number, such that if the string is written out multiple times (using an XML writer that supports this feature) the string may only be written out once and then replaced by its unique ID in all subsequent uses in order to achieve size saving.

XmlUTF8TextReader, XmlUTF8TextWriter—These classes read and write XML in text format using the UTF8 encoding. They are similar to the standard text XML readers and writers, but they are optimized for performance and derive from XmlDictionaryReader/Writer which makes them usable in the optimized code path of the Service Model serialization engine.

Exemplary Computing System and Environment

Figure 4:
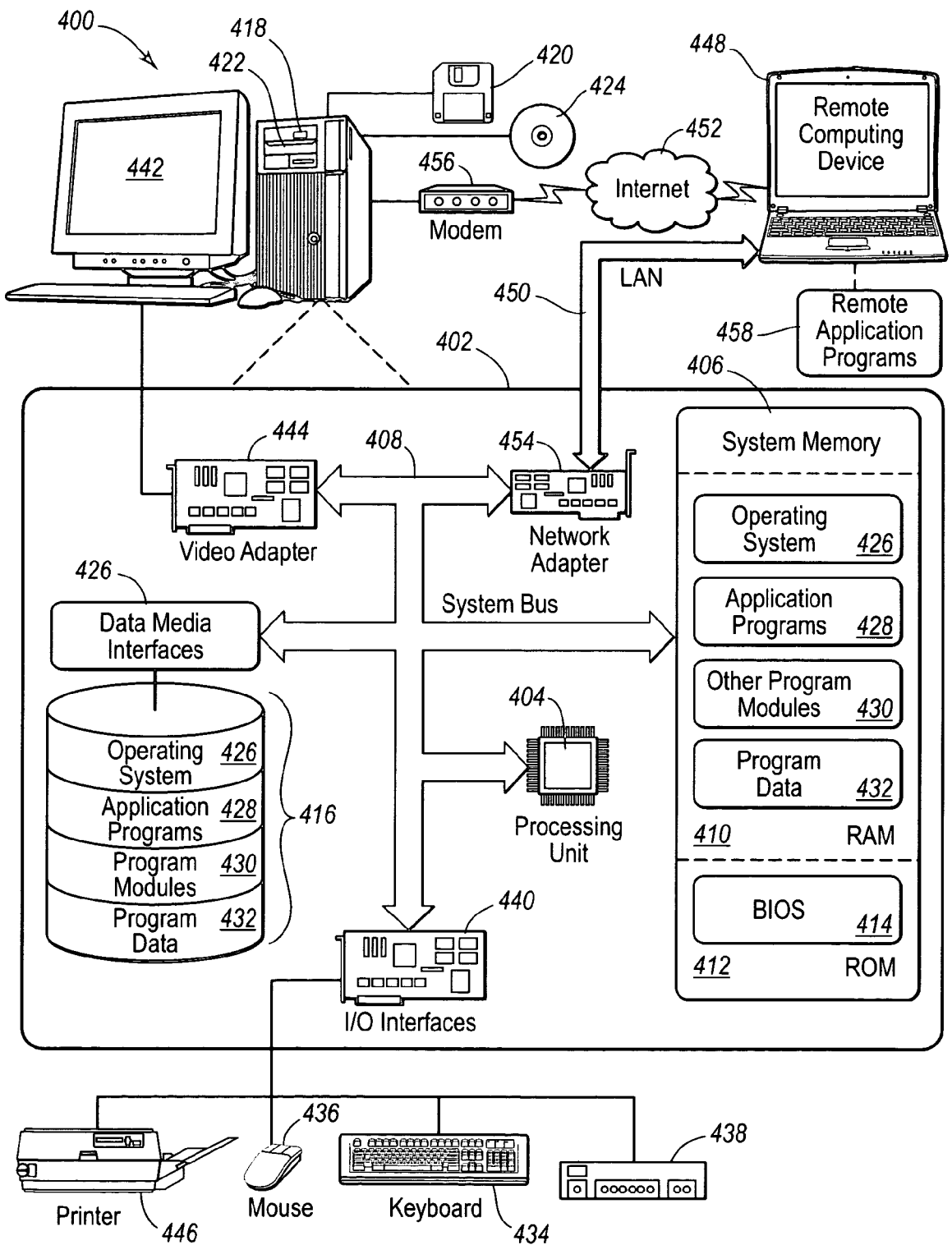
FIG. 4 is a block diagram of an exemplary computer that may execute all or part of the software architecture.

FIG. 4 illustrates an example of a suitable computing environment 400 within which the programming framework 132 may be implemented (either fully or partially). The computing environment 400 may be utilized in the computer and network architectures described herein.

The exemplary computing environment 400 is only one example of a computing environment and is not intended to suggest any limitation as to the scope of use or functionality of the computer and network architectures. Neither should the computing environment 400 be interpreted as having any dependency or requirement relating to any one or combination of components illustrated in the exemplary computing environment 400.

The framework 132 may be implemented with numerous other general purpose or special purpose computing system environments or configurations. Examples of well known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as cellular phones, personal digital assistants, handheld computers, or other communication/computing devices.

The framework 132 may be described in the general context of computer-executable instructions, such as program modules, being executed by one or more computers or other devices. Generally, program modules include routines, programs, objects, components, data structures, etc. that perform particular tasks or implement particular abstract data types. The framework 132 may also be practiced in distributed computing environments where tasks are performed by remote processing devices that are linked through a communications network. In a distributed computing environment, program modules may be located in both local and remote computer storage media including memory storage devices.

The computing environment 400 includes a general-purpose computing device in the form of a computer 402. The components of computer 402 can include, but are not limited to, one or more processors or processing units 404, a system memory 406, and a system bus 408 that couples various system components including the processor 404 to the system memory 406.

The system bus 408 represents one or more of several possible types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 402 typically includes a variety of computer readable media. Such media can be any available media that is accessible by computer 402 and includes both volatile and non-volatile media, removable and non-removable media.

The system memory 406 includes computer readable media in the form of volatile memory, such as random access memory (RAM) 410, and/or non-volatile memory, such as read only memory (ROM) 412. A basic input/output system (BIOS) 414, containing the basic routines that help to transfer information between elements within computer 402, such as during start-up, is stored in ROM 412. RAM 410 typically contains data and/or program modules that are immediately accessible to and/or presently operated on by the processing unit 404.

Computer 402 may also include other removable/non-removable, volatile/non-volatile computer storage media. By way of example, FIG. 4 illustrates a hard disk drive 416 for reading from and writing to a non-removable, non-volatile magnetic media (not shown), a magnetic disk drive 418 for reading from and writing to a removable, non-volatile magnetic disk 420 (e.g., a "floppy disk"), and an optical disk drive 422 for reading from and/or writing to a removable, non-volatile optical disk 424 such as a CD-ROM, DVD-ROM, or other optical media. The hard disk drive 416, magnetic disk drive 418, and optical disk drive 422 are each connected to the system bus 408 by one or more data media interfaces 426. Alternatively, the hard disk drive 416, magnetic disk drive 418, and optical disk drive 422 can be connected to the system bus 408 by one or more interfaces (not shown).

The disk drives and their associated computer-readable media provide non-r volatile storage of computer readable instructions, data structures, program modules, and other data for computer 402. Although the example illustrates a hard disk 416, a removable magnetic disk 420, and a removable optical disk 424, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 416, magnetic disk 420, optical disk 424, ROM 412, and/or RAM 410, including by way of example, an operating system 426, one or more application programs 428, other program modules 430, and program data 432. Each of the operating system 426, one or more application programs 428, other program modules 430, and program data 432 (or some combination thereof) may include elements of the programming framework 132.

A user can enter commands and information into computer 402 via input devices such as a keyboard 434 and a pointing device 436 (e.g., a "mouse"). Other input devices 438 (not shown specifically) may include a microphone, joystick, game pad, satellite dish, serial port, scanner, and/or the like. These and other input devices are connected to the processing unit 404 via input/output interfaces 440 that are coupled to the system bus 408, but may be connected by other interface and bus structures, such as a parallel port, game port, or a universal serial bus (USB).

A monitor 442 or other type of display device can also be connected to the system bus 408 via an interface, such as a video adapter 444. In addition to the monitor 442, other output peripheral devices can include components such as speakers (not shown) and a printer 446 which can be connected to computer 402 via the input/output interfaces 440.

Computer 402 can operate in a networked environment using logical connections to one or more remote computers, such as a remote computing device 448. By way of example, the remote computing device 448 can be a personal computer, portable computer, a server, a router, a network computer, a peer device or other common network node, and so on. The remote computing device 448 is illustrated as a portable computer that can include many or all of the elements and features described herein relative to computer 402.

Logical connections between computer 402 and the remote computer 448 are depicted as a local area network (LAN) 450 and a general wide area network (WAN) 452. Such networking environments are commonplace in offices, enterprise-wide computer networks, intranets, and the Internet.

When implemented in a LAN networking environment, the computer 402 is connected to a local network 450 via a network interface or adapter 454. When implemented in a WAN networking environment, the computer 402 typically includes a modem 456 or other means for establishing communications over the wide network 452. The modem 456, which can be internal or external to computer 402, can be connected to the system bus 408 via the input/output interfaces 440 or other appropriate mechanisms. It is to be appreciated that the illustrated network connections are exemplary and that other means of establishing communication link(s) between the computers 402 and 448 can be employed.

In a networked environment, such as that illustrated with computing environment 400, program modules depicted relative to the computer 402, or portions thereof, may be stored in a remote memory storage device. By way of example, remote application programs 458 reside on a memory device of remote computer 448. For purposes of illustration, application programs and other executable program components such as the operating system are illustrated herein as discrete blocks, although it is recognized that such programs and components reside at various times in different storage components of the computing device 402, and are executed by the data processor(s) of the computer.

An implementation of the framework 132, and particularly, the API 142 or calls made to the API 142, may be stored on or transmitted across some form of computer readable media. Computer readable media can be any available media that can be accessed by a computer. By way of example, and not limitation, computer readable media may comprise "computer storage media" and "communications media." "Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By away of example, and not limitation, communication media includes wired media such as a wired network or direct-wired connection, and wireless media such as acoustic, RF, infrared, and other wireless media. Combinations of any of the above are also included within the scope of computer readable media.

Alternatively, portions of the framework may be implemented in hardware or a combination of hardware, software, and/or firmware. For example, one or more application specific integrated circuits (ASICs) or programmable logic devices (PLDs) could be designed or programmed to implement one or more portions of the framework.

Programming Interfaces

A programming interface may be viewed as any mechanism, process, protocol for enabling one or more segment(s) of code to communicate with or access the functionality provided by one or more other segment(s) of code. One type of programming interface is an application programming interface, which is typically called by applications. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 5:
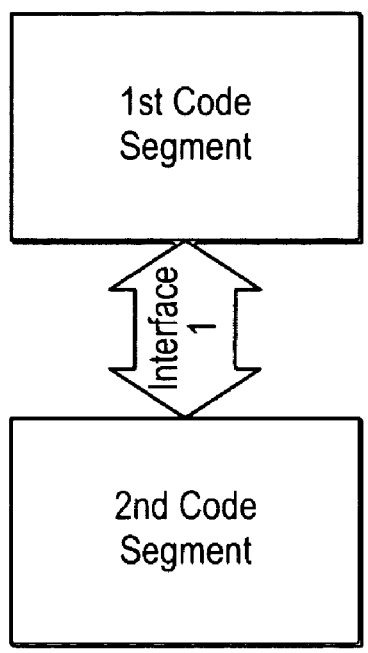
FIG. 5 is a block diagram that describes aspects of programming interfaces in accordance with one embodiment of the present invention.
Figure 6:
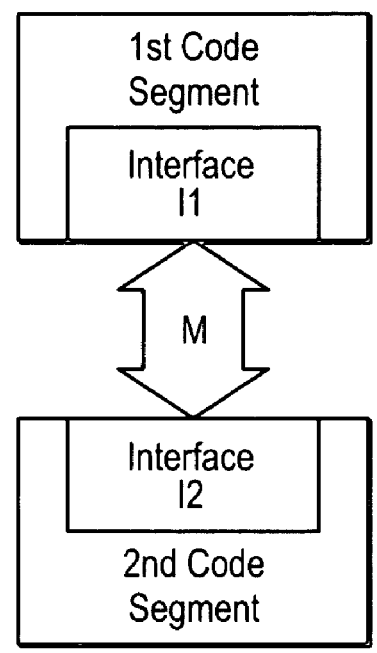
FIG. 6 is a block diagram that describes aspects of programming interfaces in accordance with one embodiment.

Notionally, a programming interface may be viewed generically, as shown in FIG. 5 or FIG. 6. FIG. 5 illustrates a programming interface Interface1 as a conduit through which first and second code segments communicate. FIG. 6 illustrates a programming interface as comprising interface objects I1 and I2 (which may or may not be part of the first and second code segments), which enable first and second code segments of a system to communicate via medium M. In the view of FIG. 6, one may consider programming interface objects I1 and I2 as separate programming interfaces of the same system and one may also consider that objects I1 and I2 plus medium M comprise the programming interface. Although FIGS. 5 and 6 show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. 5 and 6, but they nonetheless perform a similar function to accomplish the same overall result. We will now briefly describe some illustrative alternative implementations of a programming interface.

Factoring

Figure 7:
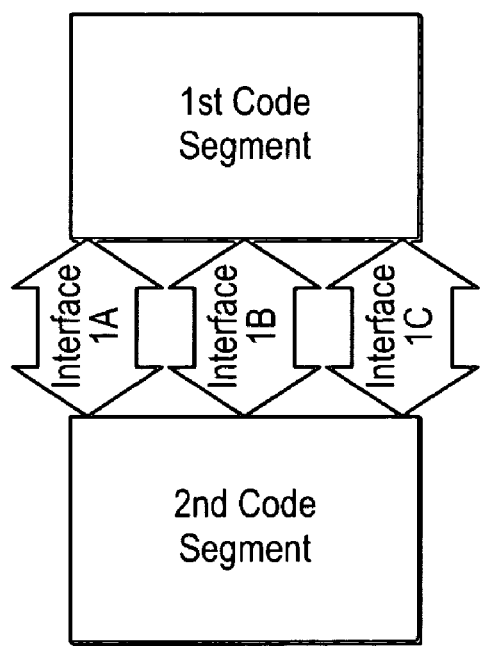
FIG. 7 is a block diagram that describes aspects of programming interfaces in accordance with one embodiment.
Figure 8:
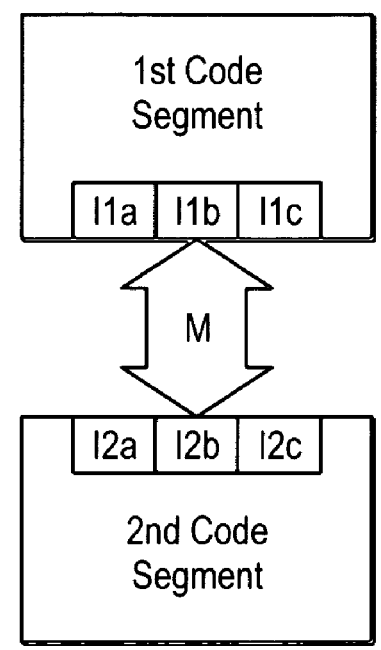
FIG. 8 is a block diagram that describes aspects of programming interfaces in accordance with one embodiment.

A communication from one code segment to another may be accomplished indirectly by breaking the communication into multiple discrete communications. This is depicted schematically in FIGS. 7 and 8. As shown, some interfaces can be described in terms of divisible sets of functionality. Thus, the interface functionality of FIGS. 5 and 6 may be factored to achieve the same result, just as one may mathematically provide 24, or 2 times 2 times 3 times 2. Accordingly, as illustrated in FIG. 7, the function provided by programming interface Interface1 may be subdivided to convert the communications of the programming interface into multiple interfaces Interface1A, Interface 1B, Interface 1C, etc. while achieving the same result. As illustrated in FIG. 8, the function provided by interface I1 may be subdivided into multiple programming interfaces I1a, I1b, I1c, etc. while achieving the same result. Similarly, programming interface I2 of the second code segment which receives information from the first code segment may be factored into multiple programming interfaces I2a, I2b, I2c, etc. When factoring, the number of interfaces included with the 1st code segment need not match the number of programming interfaces included with the 2nd code segment. In either of the cases of FIGS. 7 and 8, the functional spirit of interfaces Interface1 and I1 remain the same as with FIGS. 5 and 6, respectively. The factoring of programming interfaces may also follow associative, commutative, and other mathematical properties such that the factoring may be difficult to recognize. For instance, ordering of operations may be unimportant, and consequently, a function carried out by a programming interface may be carried out well in advance of reaching the interface, by another piece of code or interface, or performed by a separate component of the system. Moreover, one of ordinary skill in the programming arts can appreciate that there are a variety of ways of making different function calls that achieve the same result.

Redefinition

In some cases, it may be possible to ignore, add or redefine certain aspects (e.g., parameters) of a programming interface while still accomplishing the intended result. This is illustrated in FIGS. 9 and 10. For example, assume programming interface Interface1 of FIG. 5 includes a function call Square (input, precision, output), a call that includes three parameters, input, precision and output, and which is issued from the 1st Code Segment to the 2nd Code Segment. If the middle parameter precision is of no concern in a given scenario, as shown in FIG. 9, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 10, interface I1 is replaced by programming interface I1', redefined to ignore or add parameters to the interface. Programming interface I2 may similarly be redefined as programming interface I2', redefined to ignore unnecessary parameters, or parameters that may be processed elsewhere. The point here is that in some cases a programming interface may include aspects, such as parameters, that are not needed for some purpose, and so they may be ignored or redefined, or processed elsewhere for other purposes.

Inline Coding

It may also be feasible to merge some or all of the functionality of two separate code modules such that the "interface" between them changes form. For example, the functionality of FIGS. 5 and 6 may be converted to the functionality of FIGS. 11 and 12, respectively. In FIG. 11, the previous 1st and 2nd Code Segments of FIG. 5 are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to programming interface Interface1 may still be in effect. Similarly, shown in FIG. 12, part (or all) of interface I2 from FIG. 6 may be written inline into programming interface I1 to form programming interface I1". As illustrated, programming interface I2 is divided into I2a and I2b, and interface portion I2a has been coded in-line with programming interface I1 to form programming interface I1". For a concrete example, consider that the programming interface I1 from FIG. 6 performs a function call square (input, output), which is received by programming interface I2, which after processing the value passed with input (to square it) by the second code segment, passes back the squared result with output. In such a case, the processing performed by the second code segment (squaring input) can be performed by the first code segment without a call to the programming interface.

Divorce

Figure 13:
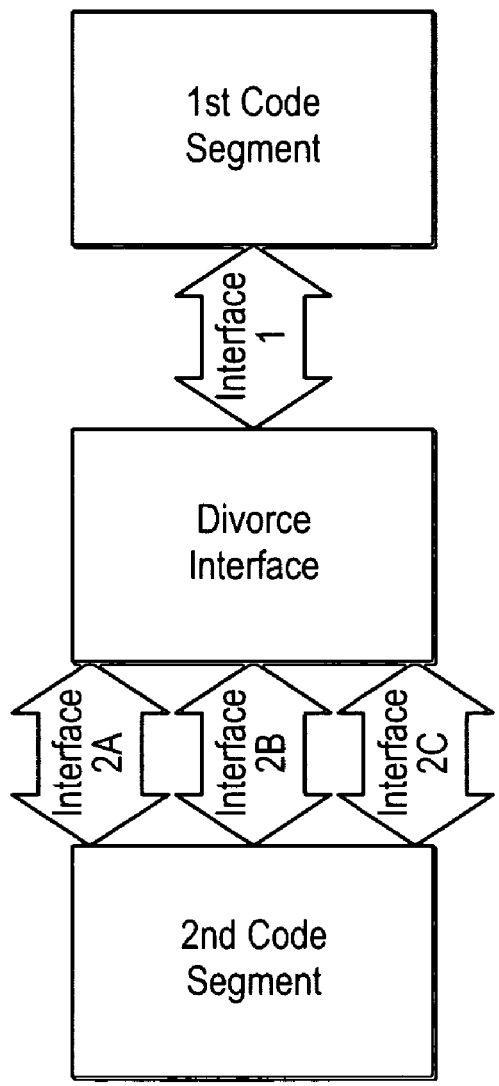
FIG. 13 is a block diagram that describes aspects of programming interfaces in accordance with one embodiment.
Figure 14:
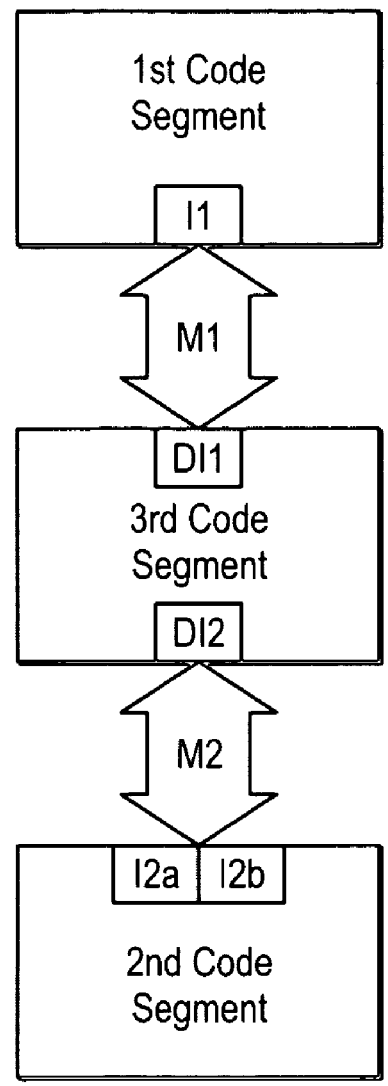
FIG. 14 is a block diagram that describes aspects of programming interfaces in accordance with one embodiment.

A communication from one code segment to another may be accomplished indirectly by breaking the communication into multiple discrete communications. This is depicted schematically in FIGS. 13 and 14. As shown in FIG. 13, one or more piece(s) of middleware (Divorce Interface(s), since they divorce functionality and/or interface functions from the original interface) are provided to convert the communications on the first interface, Interface1, to conform them to a different interface, in this case programming interfaces Interface2A, Interface2B and Interface2C. This might be done, e.g., where there is an installed base of applications designed to communicate with, say, an operating system in accordance with an Interface1 protocol, but then the operating system is changed to use a different interface, in this case programming interfaces Interface2A, Interface2B and Interface2C. The point is that the original interface used by the 2nd Code Segment is changed such that it is no longer compatible with the interface used by the 1st Code Segment, and so an intermediary is used to make the old and new interfaces compatible. C Similarly, as shown in FIG. 14, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 6 to a new operating system, while providing the same or similar functional result.

Rewriting

Figure 15:
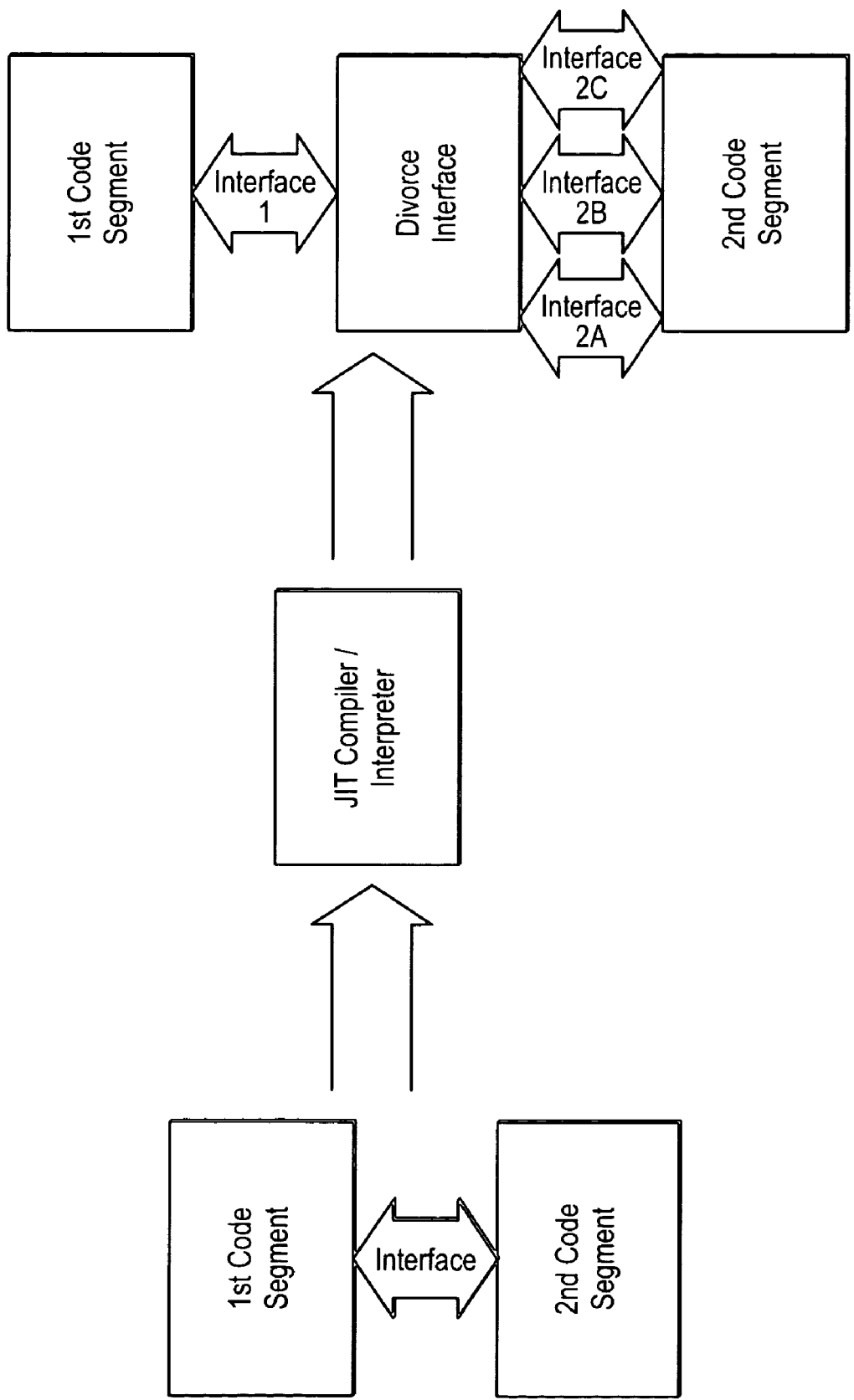
FIG. 15 is a block diagram that describes aspects of programming interfaces in accordance with one embodiment.
Figure 16:
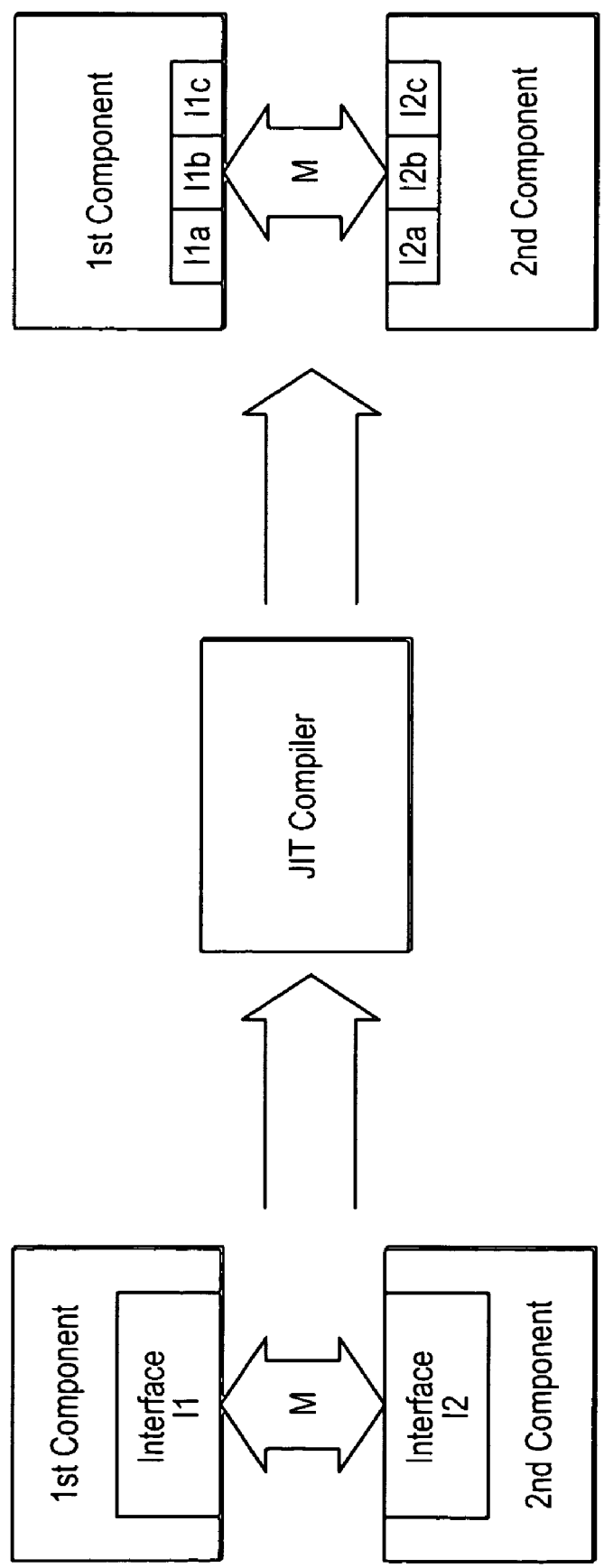
FIG. 16 is a block diagram that describes aspects of programming interfaces in accordance with one embodiment.

Yet another possible variant is to dynamically rewrite the code to replace the programming interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the ".NET" Framework, the Java runtime environment, or other similar runtime type environments). The JIT compiler may be written so as to dynamically convert the communications from the 1st Code Segment to the 2nd Code Segment, i.e., to conform them to a different interface as may be required by the 2nd Code Segment (either the original or a different 2nd Code Segment). This is depicted in FIGS. 15 and 16. As can be seen in FIG. 15, this approach is similar to the Divorce scenario described above. It might be done, e.g., where an installed base of applications are designed to communicate with an operating system in accordance with an Interface 1 protocol, but then the operating system is changed to use a different interface. The JIT Compiler could be used to conform the communications on the fly from the installed-base applications to the new interface of the operating system. As depicted in FIG. 16, this approach of dynamically rewriting the interface(s) may be applied to dynamically factor, or otherwise alter the interface(s) as well.

It is also noted that the above-described scenarios for achieving the same or similar result as a programming interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 5 and 6. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

Conclusion

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. One or more computer-readable storage media having stored thereon a plurality of application programming interface (APIs), the APIs executable by a computer processor, the plurality of APIs comprising:
   a first plurality of web services APIs, each of which being for writing a distributed, message-passing application, wherein each of the first plurality of web services APIs are represented with a first common namespace prefix corresponding with a System.ServiceModel namespace for logical grouping of the plurality of web services, wherein the System.ServiceModel namespace includes the following classes:
   EndpointAddress which represents the definition of the address of a web service;
   IChannelFactory which represents the base interface for actively creating channels;
   IListenerFactory which represent the base interface for listening at a network address; and
   Message which comprises the container within which all data exchanged between web services is encapsulated;
   a second plurality of web services APIs, each of which being for writing a distributed message-passing application and having certain common characteristics that are not present in all of the first plurality of web services APIs, wherein each of the second plurality of web services APIs are represented having both the first common namespace prefix and a second common namespace prefix that is a sub-namespace of the first common namespace prefix; and
   a third plurality of web services APIs, each of which being for writing a distributed message-passing application and having certain common characteristics that are not present in all of the first or second plurality of web services APIs, wherein each of the third plurality of web services APIs are represented having both the first common namespace prefix, the second namespace prefix, and a third common namespace prefix that is a sub-namespace of the second common namespace prefix.

2. One or more computer-readable media in accordance with claim 1, wherein the first plurality of web services APIs are represented as source code.

3. One or more computer-readable media in accordance with claim 1, wherein the first plurality of web services APIs are represented as compiled code.

4. One or more computer-readable media in accordance with claim 1, wherein the first and second plurality of web services APIs are operable on the .NET platform.

5. One or more computer-readable media in accordance with claim 1, wherein the second common namespace is "System.ServiceModel.Channels" or is compiled from the text "System.ServiceModel.Channels".

6. One or more computer-readable media in accordance with claim 1, wherein the second common namespace is "System.ServiceModel.Configuration" or is compiled from the text "System.ServiceModel.Configuration".

7. One or more computer-readable media in accordance with claim 1, wherein the second common namespace is "System.ServiceModel.Design" or is compiled from the text "System.ServiceModel.Design".

8. One or more computer-readable media in accordance with claim 1, wherein the second common namespace is "System.ServiceModel.Diagnostics" or is compiled from the text "System.ServiceModel.Diagnostics".

9. One or more computer-readable media in accordance with claim 1, wherein the second common namespace is "System.ServiceModel.Security" or is compiled from the text "System.ServiceModel.Security".

10. One or more computer-readable media in accordance with claim 9, wherein the second common namespace is "System.ServiceModel.Security.Protocols" or is compiled from the text "System.ServiceModel.Security.Protocols".

11. One or more computer-readable media in accordance with claim 1, further having thereon the following:
 a third plurality of web services APIs, each of which being for writing a distributed message-passing application and having certain common characteristics that are not present in all of the first plurality of web services APIs, wherein each of the third plurality of web services APIs are represented having both the first common namespace prefix and a third common namespace prefix that is a sub-namespace of the first common namespace prefix.

12. One or more computer-readable media in accordance with claim 11, further having thereon the following:
 a fourth plurality of web services APIs, each of which being for writing a distributed message-passing application and having certain common characteristics that are not present in all of the third plurality of web services APIs, wherein each of the fourth plurality of web services APIs are represented having both the first common namespace prefix, the third common namespace prefix and a fourth common namespace prefix that is a sub-namespace of the third common namespace prefix.

13. One or more computer-readable storage media having stored thereon a plurality of application programming interfaces (APIs), the APIs executable by a computer processor, the plurality of APIs comprising:
 a first plurality of APIs, each of which for implementing functions having first one or more common features, wherein each of the first plurality of APIs are represented with a first common namespace prefix corresponding with a namespace of System for logical grouping of the first plurality of APIs; and
 a second plurality of APIs, each of which for implementing functions having second one or more common features, wherein each of the second plurality of APIs are represented having both the first common namespace prefix and a second common namespace prefix that is a sub-namespace of the first common namespace prefix, the second common namespace prefix corresponding with a System.ServiceModel namespace which includes the following classes:
 EndpointAddress which represents the definition of the address of a web service;
 IChannelFactory which represents the base interface for actively creating channels;
 IListenerFactory which represent the base interface for listening at a network address; and
 Message which is the container within which all data exchanged between web services is encapsulated;
 wherein the third common namespace is "System.Security.Authorization" or is compiled from the text "System.Security.Authorization"; and
 a third plurality of APIs, each of which implement functions having one or more common features, wherein each of the third plurality of APIs are represented having both the first common namespace prefix and a third common namespace prefix that is a sub-namespace of the first common namespace prefix.

14. One or more computer-readable media in accordance with claim 13, wherein the first plurality of APIs is represented as source code.

15. One or more computer-readable media in accordance with claim 13, wherein the first plurality of APIs is represented as compiled code.

16. One or more computer-readable media in accordance with claim 13, wherein the first and second plurality of APIs is operable on the .NET platform.

17. One or more computer-readable media in accordance with claim 13, wherein the third common namespace is "System.Runtime.Serialization" or is compiled from the text "System.Runtime.Serialization".

18. One or more computer-readable media in accordance with claim 13, wherein the third common namespace is "System.Transactions" or is compiled from the text "System.Transactions".

19. One or more computer-readable media in accordance with claim 13, wherein the third common namespace is "System.IO.Log" or is compiled from the text "System.IO.Log".

20. One or more computer-readable media in accordance with claim 13, wherein the third common namespace is "System.Text" or is compiled from the text "System.Text".

21. One or more computer-readable media in accordance with claim 13, wherein the third common namespace is "System.Xml" or is compiled from the text "System.Xml".

22. One or more computer-readable media in accordance with claim 13, wherein the third common namespace is "System.ServiceModel" or is compiled from the text "System.ServiceModel".

23. One or more computer-readable media in accordance with claim 13, wherein the message-passing application implements Web Services.

* * * * *